United States Patent
Hayashi (10) Patent No.: US 11,993,690 B2
(45) Date of Patent: May 28, 2024

(54) POLYAMIDE-BASED RESIN EXPANDED BEADS AND MOLDED ARTICLE OF POLYAMIDE-BASED RESIN EXPANDED BEADS

(71) Applicant: JSP CORPORATION, Tokyo (JP)

(72) Inventor: Tatsuya Hayashi, Yokkaichi (JP)

(73) Assignee: JSP CORPORATION, Tokyo (JP)

( * ) Notice: Subject to any disclaimer, the term of this patent is extended or adjusted under 35 U.S.C. 154(b) by 785 days.

(21) Appl. No.: 17/168,762

(22) Filed: Feb. 5, 2021

(65) Prior Publication Data

US 2021/0253818 A1 Aug. 19, 2021

(30) Foreign Application Priority Data

Feb. 18, 2020 (JP) ................................. 2020-025729

(51) Int. Cl.
*C08J 9/18* (2006.01)
*C08J 9/228* (2006.01)

(52) U.S. Cl.
CPC ................. *C08J 9/18* (2013.01); *C08J 9/228* (2013.01); *C08J 2201/03* (2013.01); *C08J 2203/14* (2013.01); *C08J 2377/00* (2013.01)

(58) Field of Classification Search
CPC . C08J 9/18; C08J 9/228; C08J 2377/00; C08J 2203/14; C08J 2201/03
USPC ....................................................... 521/60
See application file for complete search history.

(56) References Cited

U.S. PATENT DOCUMENTS

| 11,560,458 | B2 * | 1/2023 | Hayashi | C08J 9/232 |
| 2018/0044497 | A1 * | 2/2018 | Kondo | C08J 9/18 |
| 2021/0253819 | A1 * | 8/2021 | Hayashi | C08J 9/18 |
| 2021/0317308 | A1 * | 10/2021 | Fujino | C08J 9/16 |

FOREIGN PATENT DOCUMENTS

| EP | 3950794 A1 | 2/2022 |
| JP | S61-268737 A | 11/1986 |
| JP | 2011-105879 A | 6/2011 |
| JP | 2018-044127 A | 3/2018 |
| WO | 2016/147582 A1 | 9/2016 |
| WO | 2020/031803 A1 | 2/2020 |
| WO | 2020/196893 A1 | 10/2020 |

* cited by examiner

*Primary Examiner* — Michael M. Bernshteyn
(74) *Attorney, Agent, or Firm* — Oliff PLC (57) ABSTRACT

The polyamide-based resin expanded beads are expanded beads including a polyamide-based resin as a base resin, in which the average value of bead weight of the expanded beads is 0.5 mg or more and 8 mg or less, the coefficient of variation of the bead weight of the expanded beads is 10% or less, and the average value of the ratio of a long diameter to a short diameter (a long diameter/a short diameter) of the expanded beads measured with a projection image photographing type bead size distribution analyzer is 1 or more and 1.5 or less, the coefficient of variation of the ratio (a long diameter/a short diameter) is 12% or less, the average value of the a short diameter is 1 mm or more and 4 mm or less, and the coefficient of variation of the a short diameter is 10% or less.

8 Claims, 1 Drawing Sheet

POLYAMIDE-BASED RESIN EXPANDED BEADS AND MOLDED ARTICLE OF POLYAMIDE-BASED RESIN EXPANDED BEADS

BACKGROUND

Technical Field

The present invention relates to polyamide-based resin expanded beads and molded article of polyamide-based resin expanded beads.

Related Art

Polyamide-based resins are known as resins having high heat resistance and also being superior in abrasion resistance, chemical resistance, etc. The expanded molding article prepared by expanding the polyamide-based resin can have reduced weight while maintaining superior properties such as heat resistance, abrasion resistance, and chemical resistance. Therefore, expanded molded of polyamide-based resin beads are expected to be applied to automotive components or other applications.

For example, JP 2011-105879 A proposes polyamide expanded beads (hereinafter, also referred to as conventional beads 1) containing closed cells having an average cell diameter in a prescribed range with an object of providing a polyamide foam having a high expansion ratio. In this document, the beads foaming method is focused on as a method for molding a polyamide foam. The document describes that, in order to mold a foam molding having a high expansion ratio by utilizing secondary expansion or multi-stage expansion, polyamide expanded beads suitable for this purpose are provided. The conventional beads 1 are produced by a method in which polyamide pellets are impregnated with an inert gas and then the polyamide pellets impregnated with the gas are heated with hot air or the like to afford expanded beads.

JP 61-268737 A also proposes an invention of polyamide-based pre-expanded beads (hereinafter, also referred to as conventional beads 2).

This document describes that polyamide-based resin beads, a volatile blowing agent, and a dispersion medium such as water are charged into a closed vessel, one end of the vessel is released while the temperature in the vessel is held in a range of from a temperature 50° C. lower than the melting point of the polyamide-based resin beads the beads containing the blowing agent are taken out to a low pressure environment to foam, and thus conventional beads 2 are obtained.

SUMMARY

However, the molded article of polyamide-based resin expanded beads formed using the conventional polyamide-based resin expanded beads have a problem that the surface voids are large and the surface smoothness is poor as compared with the molded article of polypropylene-based resin expanded beads and the like.

The occurrence of such a problem was inferred as follows. That is, polyamide-based resin expanded beads have a characteristic of having extremely high water vapor permeability as compared with polypropylene-based resin expanded beads and the like. Therefore, the secondary expansion at the time of in-mold foam molding using steam as a heating medium occurs insufficiently, and the smoothness of the resulting molded article of expanded beads tends to be poor.

The present invention has been devised in view of the above background. That is, it is an object of the present invention to provide polyamide-based resin expanded beads being superior in in-mold moldability and being capable of affording a molded article of polyamide-based resin expanded beads having superior surface smoothness, and provide a molded article of polyamide-based resin expanded beads.

The polyamide-based resin expanded beads of the present invention are expanded beads including a polyamide-based resin as a base resin, in which the average value of bead weight of the expanded beads is 0.5 mg or more and 8 mg or less, and the coefficient of variation of the bead weight is 10% or less, and the average value of the ratio of a long diameter to a short diameter (a long diameter/a short diameter) of the expanded beads measured with a projection image photographing type bead size distribution analyzer is 1 or more and 1.5 or less, the coefficient of variation of the ratio (a long diameter/a short diameter) is 12% or less, the average value of the a short diameter is 1 mm or more and 4 mm or less, and the coefficient of variation of the a short diameter is 10% or less.

The molded article of polyamide-based resin expanded beads of the present invention is obtained by in-mold molding the polyamide-based resin expanded beads of the present invention.

In the polyamide-based resin expanded beads of the present invention, the average value of bead weight is in a prescribed range, the coefficient of variation of the bead weights is 10% or less, and the average value of the ratio of a long diameter to a short diameter of the expanded beads is in a prescribed range, the coefficient of variation of the ratios is 12% or less, the average value of the a short diameter is in a prescribed range, and the coefficient of variation of the a short diameter is 10% or less. As described above, the polyamide-based resin expanded beads of the present invention have a nearly spherical shape, and the variations in weight and size among the beads, that is, the variation in expansion ratio is suppressed.

The polyamide-based resin expanded beads of the present invention can afford a molded article of expanded beads that exhibits good surface smoothness.

The molded article of polyamide-based resin expanded beads of the present invention formed by in-mold molding using the above-described polyamide-based resin expanded beads is superior in surface smoothness. Therefore, a molded article of expanded beads having a good appearance while utilizing the good strength and heat resistance inherent in the polyamide-based resin can be obtained.

DETAILED DESCRIPTION

Hereinafter, the polyamide-based resin expanded beads of the present invention (hereinafter, also referred to as the expanded beads of the present invention) and the molded article of polyamide-based resin expanded beads of the present invention (hereinafter, also referred to as the molded article of expanded beads of the present invention) will be described in order. As to technical contents of the terms, measurement methods, and materials to be used overlapping in the following description, the respective descriptions can be referred to as appropriate.

In the following description, preferable numerical ranges of the present invention may be indicated as appropriate. In this case, the preferred range, more preferred range, and particularly preferred range for the upper and lower limits of the numerical range can be determined from all combinations of upper and lower limits.

The present invention has been devised by fully examining the properties peculiar to the polyamide-based resin. That is, as described above, conventional molded article of expanded beads formed by in-mold molding using polyamide-based resin expanded beads have conspicuous surface voids and are insufficient in surface smoothness. The cause of the occurrence of this problem is inferred to the influence of the property peculiar to the polyamide-based resin, namely, being superior in water vapor permeability to polypropylene-based resins.

That is, in in-mold molding, the inside of a mold is filled with expanded beads and steam is supplied thereto. In general, it is known that the added expanded beads are secondary expansion in the mold due to the expansion of the blowing agent remaining inside the expanded beads and the water vapor permeating the inside of the expanded beads. However, in the expanded beads including a polyamide-based resin, which has much higher water vapor permeability than polypropylene-based resins, as a base resin, the water vapor that has permeated into the cells in the beads during steam heating expands and, during the attempt to force the beads to secondary expansion, tends to permeate from the inside of the cells to the outside of the beads. Accordingly, the force to expand the beads is weakened, so that the polyamide-based resin expanded beads are secondary expansion insufficient during in-mold molding. As a result, the surface smoothness of the resulting molded article of polyamide-based resin expanded beads was inferred to be insufficient.

The present inventor has diligently studied in view of the above-described properties peculiar to the polyamide-based resin. Then, the present inventor has found that it is possible to provide polyamide-based resin expanded beads having good surface smoothness by improving the filling property of expanded beads into a mold and sufficiently suppressing the variation in the weight and size of each expanded bead, that is, the variation in the expansion ratio, and thus has accomplished the present invention.

The details of the present invention will be described below.

[1] Polyamide-Based Resin Expanded Beads

The polyamide-based resin expanded beads of the present invention are specified to have an average value of bead weight of 0.5 mg or more and 8 mg or less, and a coefficient of variation of bead weight of 10% or less. Further, the expanded beads of the present invention are specified in that the average value of the ratio of a long diameter to a short diameter (a long diameter/a short diameter) of the expanded beads measured with a projection image photographing type bead size distribution analyzer is 1 or more and 1.5 or less, the coefficient of variation of the ratio (a long diameter/a short diameter) is 12% or less, the average value of the a short diameter is 1 mm or more and 4 mm or less, and the coefficient of variation of the a short diameter is 10% or less. That is, the expanded beads of the present invention are expanded beads having a nearly spherical shape, having high uniformity in bead weight within a specific bead weight range, and having high uniformity in the size of expanded beads within a specific size range. That is, the expanded beads of the present invention are expanded beads having high uniformity in expansion ratio (apparent density). By in-mold molding of such polyamide-based resin expanded beads of the present invention, it is possible to provide a molded article of expanded bead being superior in surface smoothness.

The polyamide-based resin expanded beads of the present invention includes a polyamide-based resin as a base resin. Examples of the polyamide-based resin in the present description include polyamide and polyamide copolymers, and polyamide copolymers are preferable.

Examples of the polyamide include such homopolymers as poly(6-aminohexanoic acid) (polycaproamide, nylon 6), which is also known as poly(caprolactam), poly(laurolactam) (Nylon 12), poly(hexamethylene adipamide) (Nylon 66), poly(7-aminoheptanic acid) (Nylon 7), poly(8-aminooctanoic acid) (Nylon 8), poly(9-aminonanonic acid) (Nylon 9), poly(10-aminodecanoic acid) (Nylon 10), poly(11-aminoundecanoic acid) (Nylon 11), poly(hexamethylene sebacamide) (Nylon 610), poly(decamethylene sebacamide) (Nylon 1010), poly(hexamethylene azelamide) (Nylon 69), poly(tetramethylene adipamide) (Nylon 46), poly(tetramethylene sebacamide) (Nylon 410), poly(pentamethylene adipamide) (Nylon 56), and poly(pentamethylene sebacamide) (Nylon 510).

The above-mentioned polyamide copolymer means a copolymer having two or more types of repeating units and having an amide linkage as at least a part of each repeating unit.

Examples of the above-mentioned polyamide copolymers include caprolactam/hexamethylene diaminoadipic acid (Nylon 6/66), caprolactam/hexamethylene diaminoadipic acid/lauryl lactam (Nylon 6/66/12), and caprolactam/lauryl lactam (Nylon 6/12).

As the polyamide-based resin, these polyamides and polyamide copolymers may be used singly or two or more species thereof may be used in combination. Among the above-mentioned polyamide-based resins, one or a combination of two or more species selected from among Nylon 6, Nylon 66, Nylon 6/66, and Nylon 6/66/12 is preferred, and Nylon 6/66 is more preferred.

The polyamide copolymer may be a block copolymer in which a certain number of the same amide repeating units are followed by a certain number of a different type of amide, or may be a random copolymer in which different types of amides are randomly arranged. In particular, the polyamide copolymer is preferably a random copolymer. When the polyamide copolymer is a random copolymer, it is possible to mold using the polyamide-based resin expanded beads with a relatively low molding steam pressure when in-mold molding them.

The polyamide-based resin expanded beads may include a thermoplastic polymer such as a thermoplastic resin other than the polyamide-based resin and a thermoplastic elastomer, as long as the object and effect of the present invention are not impaired. Examples of the other thermoplastic resins include polyethylene-based resins, polypropylene-based resins, polystyrene-based resins, thermoplastic polyester-based resins, and acrylic resins. Examples of the thermoplastic elastomer include styrene-based thermoplastic elastomers, olefin-based thermoplastic elastomers, and amide-based thermoplastic elastomers. The blending amount of the thermoplastic polymer is preferably 20 parts by mass or less, more preferably 10 parts by mass or less, and further preferably 5 parts by mass or less, per 100 parts by mass of the polyamide-based resin as the base resin, and it is particularly preferable that the resin forming the polyamide-based resin expanded beads be only a polyamide-based resin.

In the polyamide-based resin expanded beads, one or more species of various commonly used additives such as cell controlling agents, antistatic agents, conductivity-imparting agents, lubricants, antioxidants, ultraviolet absorbers, flame retardants, metal deactivators, colorants (pigments, dyes, etc.), crystal nucleating agents, and fillers may, as necessary, be appropriately blended in addition to the polyamide-based resin as the base resin. Examples of the cell controlling agents include inorganic cell controlling agents such as talc, sodium chloride, calcium carbonate, silica, titanium oxide, gypsum, zeolite, borax, aluminum hydroxide, alum, and organic cell controlling agents such as phosphoric acid-based compounds, amine-based compounds, and polytetrafluoroethylene (PTFE). The addition amount of these various additives varies depending on the purpose of use of the molded article of expanded bead, but is preferably 20 parts by mass or less per 100 parts by mass of the base resin forming the polyamide-based resin expanded beads. The addition amount is more preferably 15 parts by mass or less, even more preferably 10 parts by mass or less, and further preferably 5 parts by mass or less.

The melting point of the polyamide-based resin, which is the base resin of the polyamide-based resin expanded beads of the present invention, is not particularly limited, but is preferably 175° C. or higher, more preferably 180° C. or higher, and even more preferably 185° C. or higher. On the other hand, the melting point is preferably 280° C. or lower, more preferably 260° C. or lower, further preferably 240° C. or lower, and particularly preferably 230° C. or lower. It is preferable that the melting point of the polyamide-based resin satisfy the above range because, if so, it is easy to obtain polyamide-based resin expanded beads having a low apparent density and it is easy to obtain polyamide-based resin expanded beads having superior heat resistance.

As to the above-mentioned melting point of the polyamide-based resin, when the base resin is a single polyamine-based resin, the melting point refers to the melting point of the polyamide-based resin. When the base resin is composed of a mixture of two or more types of polyamide-based resins, the melting point of the above-mentioned polyamide-based resin refers to the melting point of the mixture kneaded in advance with an extruder or the like.

The melting point of the polyamide-based resin can be determined as the temperature of the top of the melting peak of a second DSC curve (melting peak temperature) obtained by the heat flux differential scanning calorimetry based on JIS K7121-1987, and specifically by heat-melting the resin at a heating rate of 10° C./minute from 30° C. to a temperature 30° C. higher than the temperature at the end of a melting peak (i.e., first heating), then keeping the resin at that temperature for 10 minutes, then cooling the resin to 30° C. at a cooling rate of 10° C./minute, and then heat-melting the resin at a heating rate of 10° C./minute up to a temperature 30° C. higher than the temperature at the end of a melting peak. When the DSC curve has a plurality of melting peaks, the melting peak temperature of the melting peak having the largest area is adopted as the melting point of the polyamide-based resin. The above-described measurement of a melting point is performed after the polyamide-based resin is allowed to stand for 24 hours or more in an environment with a temperature of 23° C. and a relative humidity of 50% to adjust the state. As the measuring device, for example, a high-sensitivity differential scanning calorimeter "EXSTAR DSC7020" (manufactured by SII NanoTechnology Inc.) can be used.

The polyamide-based resin in the present description preferably has a flexural modulus of 1000 MPa or more, more preferably 1200 MPa or more, and even more preferably 1500 MPa or more. The amide-based elastomer has a flexural modulus of about 600 MPa or less. It is preferable that the flexural modulus of the polyamide-based resin be within the above range, because, if so, the resin is difficult to shrink due to the high flexural modulus even when exposed to room temperature after foaming and expanded beads having a high expansion ratio can be easily obtained. Further, that is preferable also because superior in-mold moldability is afforded due to such high flexural modulus. The upper limit of the flexural modulus of the polyamide-based resin is generally 3000 MPa.

The flexural modulus of the polyamide-based resin can be determined by allowing the test piece to stand at a temperature of 23° C. and a humidity of 50% for 24 hours and then measuring it in accordance with JIS K7171: 2016.

The polyamide-based resin in the present description preferably has a density of 1.05 g/cm$^3$ or more, and preferably 1.1 g/cm$^3$ or more. The density of the amide-based elastomer is generally less than 1.05 g/cm$^3$. The density can be measured based on the method described in ISO 1183-3.

The polyamide-based resin expanded beads of the present invention may be single-layered expanded beads or may be expanded beads having a multi-layered structure including a core layer and a covering layer.

When the polyamide-based resin expanded beads having the multi-layered structure have a polyamide-based resin expanded layer as the core layer and a polyamide-based resin covering layer that covers the expanded layer (core layer), the following embodiment is preferred. That is, the melting point (Tms) of the polyamide-based resin forming the covering layer is preferably lower than the melting point (Tmc) of the polyamide-based resin forming the core layer, and more preferably is 20° C. or more lower than the melting point (Tmc). This makes it possible to provide polyamide-based resin expanded beads that can be in-mold molded with low-pressure molding steam while maintaining high heat resistance.

(Bead Weight)

The average value of bead weight of the expanded beads of the present invention is 0.5 mg or more and 8 mg or less. That the average value of the bead weight is 0.5 mg or more and 8 mg or less is preferable from the viewpoint that the balance between the filling property of the expanded beads and the secondary expansion property of the expanded beads during in-mold molding is improved and, as a result, a molded article of expanded beads having superior surface smoothness can be easily obtained. From this point of view, the average value of the bead weight is preferably 1 mg or more, and more preferably 1.5 mg or more. The average value of the bead weight is preferably 5 mg or less, and more preferably 3 mg or less.

The average value of bead weight of the above-mentioned expanded beads is determined as follows. Specifically, 50 or more expanded beads are randomly chosen from the produced polyamide-based resin expanded beads, bead weight is measured for each bead, and the arithmetic mean value of the respective measured weights is calculated. The weight of the polyamide-based resin expanded beads is measured after being allowed to stand for 24 hours or more in an environment with a temperature of 23° C. and a relative humidity of 50%.

The coefficient of variation of the bead weight of the expanded beads of the present invention (coefficient of variation C) is 10% or less.

The coefficient of variation C can be determined from the following formulae (1) and (2).

[Numerical Formula 1]

$$\text{Coefficient of variation } C \text{ of bead weight}(\%) = \frac{\text{Standard deviation } V \text{ of bead weight of expanded beads}}{\text{Average value } W_{av} \text{ of bead weight of expanded beads}} \times 100 \quad (1)$$

[Numerical Formula 2]

$$\text{Standard deviation } V \text{ of bead weight} = \left(\sum (W_i - W_{av})^2/(n-1)\right)^{1/2} \quad (2)$$

Here, $W_i$ is the bead weight of each of the polyamide-based resin expanded beads 1 to n sampled in order to calculate the average value of the bead weight. $W_{av}$ represents the arithmetic mean value of the bead weights of the above-mentioned polyamide-based resin expanded bead samples 1 to n. n represents the number of samples, and n is 50 or more.

As described above, the expanded beads of the present invention are configured such that the average value of bead weight is in the above range and the coefficient of variation of the weight is 10% or less. That is, the expanded beads of the present invention are superior in the uniformity of the weights of the respective beads, that is, the uniformity of the sizes of the resin beads before expanding.

(Dimensions and Shape of Expanded Beads)

Next, the dimensions (a long diameter and a short diameter) of the expanded beads of the present invention will be described.

The a long diameter of the expanded beads refers to the dimension of the longest part of the expanded beads measured with a projection image photographing type bead size distribution analyzer, and the short diameter refers to the dimension of the shortest part of the expanded beads.

In the expanded beads of the present invention, the average value of the ratio of a long diameter to a short diameter (a long diameter/a short diameter) of the expanded beads measured with a projection image photographing type bead size distribution analyzer is 1 or more and 1.5 or less. That the average value of the ratio is close to 1 means that the expanded beads are nearly spherical in shape. Further, the coefficient of variation of the ratio (a long diameter/a short diameter) is 12% or less. This means that the shape of the expanded beads is highly uniform. The average value of the above ratio is preferably 1 or more and 1.3 or less, and more preferably 1 or more and 1.2 or less. The coefficient of variation of the ratio is preferably 10% or less, and more preferably 8% or less.

The average value of the ratio of a long diameter to a short diameter (a long diameter/a short diameter) of the expanded beads and the coefficient of variation of the ratio (a long diameter/a short diameter) are determined as follows. That is, the short diameter and the long diameter of each of 1000 or more randomly chosen expanded beads are measured as a sample group, and the ratio of the long diameter to the short diameter (a long diameter/a short diameter) of each expanded bead is determined. Then, the arithmetic mean value of them is taken as the average value of the ratio of a long diameter to a short diameter of the expanded beads.

Further, the coefficient of variation of the ratios is determined from the following formulae (3) and (4).

[Numerical Formula 3]

$$\text{Coefficient of variation } C \text{ of ratio}(\text{a long diameter/a short diameter})(\%) = \frac{\text{Standard deviation } V \text{ of ratio (a long diameter/a short diameter)}}{\text{Average value } T_{av} \text{ of ratio(a long diameter/short diameter)}} \times 100 \quad (3)$$

Here, $T_i$ is the value of the ratio (a long diameter/a short diameter) of each individual expanded bead, $T_{av}$ is the average value obtained by arithmetically averaging the ratios (a long diameter/a short diameter) of the individual expanded beads, and n is the number of the measured expanded beads (that is, 1000 or more).

The average value of a short diameter of the expanded beads of the present invention is 1 mm or more and 4 mm or less. The average value of the short diameters is preferably 1.5 mm or more, and more preferably 2 mm or more. The average value of the short diameters is preferably 3.5 mm or less, and more preferably 3 mm or less. The arithmetic mean value of the short diameters of the individual expanded beads measured by the above measurement is taken as the average value of a short diameter of the expanded beads.

Further, the expanded beads of the present invention have a coefficient of variation of a short diameter of 10% or less, preferably 9% or less, and more preferably 8% or less.

The coefficient of variation of the short diameter is determined as follows. That is, as described above, the arithmetic mean value of the short diameter determined as described above for expanded beads group, and then the coefficient of variation of the short diameter can be determined from the following formulae (5) and (6).

[Numerical Formula 5]

$$\text{Coefficant of variation } C \text{ of a short diameter } (\%) = \frac{\text{Standard deviation } V \text{ of a short diameter}}{\text{Average value } T_{av} \text{ of a short diameter}} \times 100 \quad (5)$$

[Numerical Formula 6]

$$\text{Standard deviation } V \text{ of a short diameter} = \left(\sum (T_i - T_{av})^2/(n-1)\right)^{1/2} \quad (6)$$

Here, $T_i$ is the short diameter of each expanded bead, $T_{av}$ is the arithmetic mean value determined by arithmetically averaging the short diameters of the individual expanded beads, and n is the number of the expanded beads measured (that is, 1000 or more).

The expanded beads of the present invention defined as described above are nearly spherical in shape, and the variation in shape among the expanded beads is small. Further, the expanded beads of the present invention are characterized in that the average value of bead weight of the expanded beads is within a specific range and the variation in bead weight among the expanded beads is small, and that the average value of dimensions of the expanded beads is within a specific range and the difference in dimensions among the expanded beads is kept small. That is, in the present invention, the expanded beads is superior in uniformity of the expansion ratio, and the expanded beads is superior in uniformity of the size. Therefore, the expanded beads of the present invention are superior in filling property into a mold at the time of in-mold molding. Further, the expanded beads of the present invention are unlikely to exhibit a difference in foamability at the time of secondary expanding among the expanded beads under prescribed expanding conditions. Therefore, the present invention can provide a molded article of expanded bead having good surface smoothness.

Examples of the projection image photographing type bead size distribution analyzer include, but are not limited to, a bead size distribution analyzer PartAn 3D manufactured by MicrotracBEL Corp. The measurement with the projection image photographing type bead size distribution analyzer is performed specifically by a method of capturing a projection image of a sample that freely falls while rotating from a sample feeder with a CCD camera.

(Modification of Polyamide-Based Resin)

In the present invention, the polyamide-based resin is preferably a modified polyamide-based resin modified with one or more compounds (hereinafter, also referred to as modifiers) selected from among a carbodiimide compound, an oxazoline compound, an isocyanate compound, and an epoxy compound. By being modified with the above compound, a part or all of the molecular chain ends of the polyamide-based resin are blocked. Among the above compounds, a carbodiimide compound is preferred. Specific examples thereof include aromatic monocarbodiimides such as bis(dipropylphenyl)carbodiimide, aromatic polycarbodiimides, and aliphatic polycarbodiimides such as poly(4,4'-dicyclohexylmethanecarbodiimide).

Specific examples of the bis(dipropylphenyl)carbodiimide include "Stabaxol 1-LF" manufactured by Rhein Chemie Corp. Specific examples of the aromatic polycarbodiimide include "Stabaxol P", "Stabaxol P100" and "Stabaxol P400" manufactured by Rhein Chemie Corp. Specific examples of the aliphatic polycarbodiimide include "CARBODILITE LA-1" manufactured by Nisshinbo Chemical Inc.

Among the carbodiimide compounds, polymer-type carbodiimide compounds such as the aromatic polycarbodiimide and the aliphatic polycarbodiimide are preferable. When a polyamide-based resin is modified in an extruder using a polymer-type carbodiimide compound, the carbodiimide compound is prevented from volatilizing before the polyamide-based resin is modified. The polymer-type carbodiimide compound refers to one having a number average molecular weight of about 1000 or more. Further, among the carbodiimide compounds, polyfunctional type carbodiimide compounds such as the aromatic polycarbodiimide and the aliphatic polycarbodiimide are preferable. These modifiers may be used singly or two or more of them may be used in combination.

The polyamide-based resin modified with the modifier refers to a resin in which the functional group at a molecular chain terminal is blocked with the modifier. Hydrolysis of the modified polyamide-based resin is further suppressed. This facilitates the maintenance of a good cell structure when the expanded beads are used in-mold molded. The ratio at which the terminal group of the molecular chain of the polyamide-based resin is blocked by the modifier (terminal blocking ratio) is preferably 50% or more, more preferably 70% or more, and even more preferably 90% or more from the viewpoint of suppressing hydrolysis. The measurement of the terminal blocking ratio is performed as follows. The number average absolute molecular weight (Mn) of polyamide is measured by GPC-MALS or the like, and the total number of molecular chain terminal groups is calculated using the relational expression: total number of molecular chain terminal groups (eq/g)=2/Mn. By titration, the number of carboxyl group terminals (eq/g) of polyamide [a solution of the polyamide in benzyl alcohol is titrated with 0.1 N sodium hydroxide] and the number of amino group terminals (eq/g) [a solution of the polyamide in phenol is titrated with 0.1 N hydrochloric acid] are be measured, and the terminal blocking ratio can be determined using the following formula (7).

[Numerical Formula 7]

$$\text{Terminal blocking ratio (\%)} = [(A-B)/A] \times 100 \quad (7)$$

In the formula (7), A represents the total number of the terminal groups in the molecular chain (this is usually equal to twice the number of polyamide molecules), and B represents the total number of unblocked carboxyl group terminals and amino group terminals.

When the polyamide-based resin to be used in the present invention has been modified with the above-mentioned modifier, hydrolysis during the production process of the polyamide-based resin expanded beads is more certainly suppressed due to the modification. Owing to this, the resin beads are more uniformly expanded, whereby polyamide-based resin expanded beads having superior size uniformity can be easily obtained. Further, a polyamide-based resin exhibits a slower crystallization rate than a polypropylene-based resin and the like. Owing to this, the crystallization of the polyamide-based resin may not be sufficiently completed at the end of the step involving heating before the expanding step, and the crystallization may proceed also during the expanding step. When the time of the expanding step becomes long due to the progress of such crystallization, the expanded beads released to the outside of the device in the second half of the expanding step and then expanded tend to be crystalized more than the expanded beads released to the outside of the device in the first half of the expanding step and then expanded. Contrarily, a polyamide-based resin having the molecular chain terminals of which are modified with the above-described compound exhibits suppressed crystallization during a expanding step and is expanded with a more uniform crystal state, so that variation in size of expanded beads can be suppressed more easily.

(Crystallinity of Polyamide-Based Resin Expanded Beads)

The polyamide-based resin expanded beads of the present invention preferably have a crystal structure that exhibits, in the DSC curve produced under the following Condition 1, an intrinsic peak inherent in the polyamide-based resin and a high temperature peak having a peak top temperature on the higher temperature side than the peak top temperature of the intrinsic peak:

(Condition 1)

Based on the heat flux differential scanning calorimetry of JIS K7121-1987, polyamide-based resin expanded beads are used as a test piece, and the above-mentioned DSC curve is measured by heat-melting it at a heating rate of 10° C./minute from 30° C. to a temperature 30° C. higher than the temperature at the end of the melting peak.

In the DSC curve produced under Condition 1, the intrinsic peak is a melting peak due to the crystal structure inherent in the polyamide-based resin to be used as a raw material for the expanded beads. On the other hand, the high temperature peak is a melting peak caused by secondary crystals formed by the thermal history in the process of impregnating the resin beads with a blowing agent and expanding them to obtain expanded beads. For the measurement under Condition 1, polyamide-based resin expanded beads which have been allowed to stand for 24 hours or more in an environment with a temperature of 23° C. and a relative humidity of 50% are used as a sample to be measured.

Figure 1:
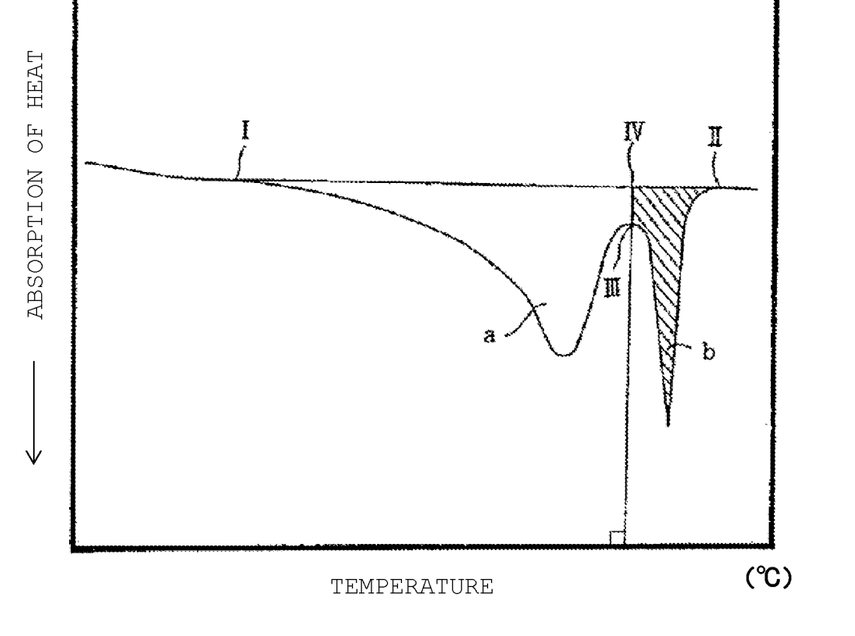
FIG. 1 is a DSC curve of the polyamide-based resin expanded beads of the present invention measured based on the heat flux differential scanning calorimetry.

FIG. 1 shows the DSC curve produced under Condition 1 of the polyamide-based resin expanded beads according to one embodiment of the present invention. As shown in FIG. 1, it is preferable that the polyamide-based resin expanded beads of the present invention exhibit not only the intrinsic peak a but also a higher temperature peak b having a peak top temperature within a temperature region higher than the peak top temperature of the intrinsic peak a as the melting peaks in the DSC curve measured based on the heat flux differential scanning calorimetry. Although there is one high temperature peak b in FIG. 1, the high temperature peak b may include two or more peaks located in the range of Condition 1.

The expanded beads having a crystal structure in which a high temperature peak appears can be produced by a production method in which a crystallization treatment is performed by a temperature holding step described later at the time of producing the expanded beads. By producing expanded beads through a thermal history for generating a high temperature peak, beads are easily expanded more uniformly at the time of expanding and it is possible to easily obtain expanded beads that are superior in uniformity of size. Even when using resin beads including a polyamide-based resin modified with a modifier as a base resin, it is possible to obtain expanded beads having a crystal structure that exhibits a high temperature peak by performing a crystallization treatment during a temperature holding step.

From the viewpoint described above, the amount of the heat of fusion of the high temperature peak b is preferably 5 J/g or more and 30 J/g or less. When the high temperature peak b includes two or more peaks, the total amount of the heat of fusion of these peaks is taken as the amount of the heat of the high temperature peak. The amount of heat of fusion is more preferably 6 J/g or more, and even more preferably 7 J/g or more, and is more preferably 25 J/g or less, and even more preferably 20 J/g or less.

The amount of the heat of fusion of the high temperature peak of the polyamide-based resin expanded beads corresponds to, for example, the area of the high temperature peak b having a peak top temperature on the higher temperature side than the peak top temperature of the intrinsic peak a in the DSC curve shown in FIG. 1. The amount of the heat of fusion of the high temperature peak can be determined as follows. First, as shown in FIG. 1, a straight line connecting the point I at 150° C. on the DSC curve and the point II indicating the melt ending temperature on the DSC curve is drawn. Next, the intersection of a straight line that passes point III on the DSC curve corresponding to the valley between the intrinsic peak a and the high temperature peak b and is perpendicular to the temperature as the horizontal axis of the graph and a straight line connecting the points I and II is named point IV. The area of the part surrounded by the straight line connecting the points IV and II, the straight line connecting the points III and IV, and the DSC curve connecting the points III and II (diagonal part) obtained in this way corresponds to the amount of the heat of fusion of the high temperature peak.

When producing expanded beads using a polyamide-based resin, polyamide-based resin expanded beads that exhibit the above-described intrinsic peak and high temperature peak can be produced by appropriately setting the heating conditions for the polyamide-based resin before expanding. Details of a desirable production method will be described later.

Based on the Condition 1 described above, the test piece is heat-melted from 30° C. to a temperature 30° C. higher than the temperature at the end of the melting peak at a heating rate of 10° C./minute to measure the DSC curve, and then a second DSC curve can be measured under the following Condition 2. Specifically, a DSC curve is produced based on Condition 1, and then, as Condition 2, the test piece is held at that temperature (i.e., the temperature of ending the DSC curve measurement under Condition 1) for 10 minutes, and subsequently, the test piece is cooled to 30° C. at a cooling rate of 10° C./minute, followed by heat-melting it again to a temperature 30° C. higher than the temperature at the end of the melting peak (the second intrinsic peak) at a heating rate of 10° C./minute. Under such Condition 2, the second DSC curve can be measured. The second DSC curve exhibits only the intrinsic peak (the second intrinsic peak) and does not exhibit a high temperature peak. The intrinsic peak appears on both the first and second DSC curves, and the peak top temperature may differ slightly between the first one and the second one, but the difference is within 5° C., and usually within 2° C. The high temperature peak detected the first time is located on the higher temperature side of the second intrinsic peak. The second intrinsic peak corresponds to the intrinsic peak of the polyamide-based resin to be used as a raw material.

The apparent density of the expanded beads of the present invention is not particularly limited, but is preferably 10 kg/m$^3$ or more, more preferably 30 kg/m$^3$ or more, and even more preferably 50 kg/m$^3$ or more. The apparent density of the expanded beads is preferably 300 kg/m$^3$ or less, more preferably 250 kg/m$^3$ or less, and even more preferably 150 kg/m$^3$ or less. When the apparent density of the expanded beads is within the above range, the expanded beads and the molding made from the expanded beads are less likely to shrink, and a good molded article of expanded beads can be easily obtained. The apparent density of the polyamide-based resin expanded beads is determined by dividing the weight (kg) of the expanded beads by the apparent volume (m$^3$) of the expanded beads.

The average cell diameter of the polyamide-based resin expanded beads of the present invention is preferably 30 μm or more, more preferably 50 μm or more, and even more preferably 100 μm or more. The average cell diameter of the expanded beads is preferably 300 μm or less, more preferably 200 μm or less, and even more preferably 180 μm or less. The average cell diameter of the polyamide-based resin expanded beads is measured by the following method.

First, an expanded bead is divided into two so as to pass through the center of the expanded bead, and the cut surface is photographed with a scanning electron microscope. Next, in the obtained cross-sectional photograph, straight lines are drawn from the vicinity of the center of the cut surface of the expanded bead to the surface of the expanded bead in eight directions with variation of angle by 45°, and the number of all cells intersecting the straight lines is counted. The value determined by dividing the total length of the straight lines by the number of the counted cells is defined as the cell diameter of the expanded bead. This operation is performed in the same manner for 10 or more expanded beads, and the arithmetic mean value of the cell diameters of the respective expanded beads is taken as the average cell diameter of the expanded beads.

[Molded Article of Polyamide-Based Resin Expanded Beads]

The molded article of expanded beads of the present invention is produced using the polyamide-based resin expanded beads of the present invention. The polyamide-based resin expanded beads of the present invention can be converted into a molded article of polyamide-based resin expanded beads (molded article of expanded beads) by in-mold molding. As the in-mold molding method, a conventionally known method can be adopted, and a method of heating with steam is preferable. When the in-mold molding method using steam is employed, the polyamide-based resin forming the polyamide-based resin expanded beads is plasticized by water absorption, so that the molding steam pressure can be lowered. When the resulting molded article of expanded beads is dried to remove water, the original physical properties of the polyamide-based resin are restored, so that a molded article of expanded beads having high heat resistance is afforded.

The molded article of expanded beads has high heat resistance and is superior in abrasion resistance, chemical resistance, etc. and also in surface smoothness. Accordingly, the molded article of expanded beads is suitable as a member of an automotive component.

[3] Method for Producing Polyamide-Based Resin Expanded Beads

Polyamide-based resin expanded beads having little variation in dimensions with the configuration specified in the present invention can be obtained, for example, by the following production method. However, the following description does not limit the method for producing the above-described polyamide-based resin expanded beads of the present invention.

The polyamide-based resin expanded beads of the present invention can be obtained by impregnating polyamide-based resin beads with a blowing agent to obtain expandable polyamide-based resin beads, and then expanding the resin beads. The method for expanding the polyamide-based resin beads is not particularly limited. For example, the expandable polyamide-based resin beads can be expanded by heating them with a heat medium such as steam, air, or oil. It is preferable to perform the expanding in a heat medium such as oil because it is easy to keep the temperature of the expandable polyamide-based resin beads uniform at the time of the expanding and it is easy to suppress the variation in size of the expanded beads.

It is also possible to expand the expandable polyamide-based resin beads placed under pressure by reducing the pressure. In this case, it is preferable to expand the expandable polyamide-based resin beads by releasing the expandable polyamide-based resin beads dispersed in a dispersion medium such as water under heating and pressurization in a closed vessel, to a pressure lower than the pressure in the closed vessel together with water.

(Method for Producing Polyamide-Based Resin Expanded Beads)

Hereinafter, there is described a method of producing expanded beads of the present invention by a production method including a step of dispersing polyamide-based resin beads in water in a closed vessel to obtain a dispersion liquid, a step of adding a blowing agent into the closed vessel, and a step of expanding. The above-mentioned step of expanding is more specifically a step that involves adjusting the temperature of the dispersion liquid immediately before expanding to a temperature suitable for expanding, and releasing the polyamide-based resin beads containing the blowing agent, together with water from the closed vessel to a pressure lower than the pressure inside the closed vessel to expand the beads.

[Dispersion Step]

The dispersion step is a step of dispersing polyamide-based resin beads in an aqueous dispersion medium such as water in a closed vessel to obtain a dispersion liquid. Examples of the closed vessel include an autoclave that can be pressurized.

The method for dispersing the polyamide-based resin beads in the dispersion medium is not particularly limited, and a conventionally known method may be used. For example, a dispersion liquid can be obtained by preparing a closed vessel equipped with a stirrer, adding polyamide-based resin beads to an aqueous dispersion medium charged in the vessel, and stirring the mixture. Examples of the aqueous dispersion medium include water or a liquid material mainly composed of water, and among them, water is preferably used.

If necessary, dispersants such as inorganic substances such as aluminum oxide, tricalcium phosphate, magnesium pyrophosphate, zinc oxide, kaolin, mica, talc, and smectite, and dispersion aids such as anionic surfactants such as sodium dodecylbenzene sulfonate and sodium alkane sulfonate may be added to the dispersion medium. The mass ratio of the polyamide-based resin beads to the dispersant (resin beads/dispersant) is preferably from 20 to 2000, and more preferably from 30 to 1000. The mass ratio of the dispersant to the dispersion aid (dispersant/dispersion aid) is preferably from 1 to 500, and more preferably from 1 to 100.

The method for producing the polyamide-based resin beads to be used in the present invention is not particularly limited, and they may be produced by a conventionally known method. For example, polyamide-based resin beads can be produced by such a method as a strand cut method, a hot cut method, or an underwater cut method (UWC method). The strand cut method is a method in which a polyamide-based resin and, if necessary, an additive such as a cell controlling agents and a colorant are put into an extruder and kneaded to afford a melt-kneaded material, and the melt-kneaded material is extruded into a strand form through a small hole of a die attached to the tip of the extruder, and then the melt-kneaded material in a strand form is cut with a pelletizer into a prescribed mass to obtain granules. The hot cut method is a method in which a melt-kneaded material is extruded into a gas phase and then immediately cut to obtain granules. The underwater cut method (UWC method) is a method in which a melt-kneaded material is extruded into water and then immediately cut to obtain granules.

When producing the polyamide-based resin beads, it is preferable that the water content of the stock polyamide-based resin to be fed to the extruder is adjusted to 0.1% by weight or less. As a result, the weight of the resin beads can be made more uniform, and the coefficient of variation of the bead weight of the resin beads can be made smaller.

When producing the expanded beads, a polyamide-based resin whose molecular chain terminals are blocked and modified with one or more compounds selected from among a carbodiimide compound, an oxazoline compound, an isocyanate compound, and an epoxy compound may be used. Such modification may be carried out before the expanding step. In the dispersion step, a polyamide-based resin having pre-modified molecular chain terminals may be used, or in the dispersion step or the blowing agent addition step described later, molecular chain terminals of a polyamide-based resin may be blocked by adding a blocking agent and unblocked polyamide-based resin beads to a dispersion liquid.

When producing polyamide-based resin beads, it is preferable to use a pre-modified polyamide-based resin as a stock polyamide-based resin, or to feed an unmodified polyamide-based resin and a modifier, thereby modifying the polyamide-based resin in an extruder to form a modified polyamide-based resin. As a result, polyamide-based resin beads having a more uniform bead weight can be easily obtained.

When such blocking is performed in the dispersion step or the blowing agent addition step, for example, it is preferable to add the terminal blocking agent into the dispersion medium in a range of 0.1 parts by mass or more and 5 parts by mass or less per 100 parts by mass of the polyamide-based resin, and it is more preferable to add the agent in a range of 0.3 parts by mass or more and 3 parts by mass or less. For details of the blocking agent, the description thereon in the description of the polyamide-based resin expanded beads of the present invention is referred to.

[Blowing Agent Addition Step]

The blowing agent addition step is a step of adding a blowing agent into a closed vessel. The timing when the blowing agent with which the polyamide-based resin beads are to be impregnated is added into the closed vessel may be any timing before the expanding step, and may be any time selected from among the dispersion step, the timing of raising the temperature to the expanding temperature, and the temperature holding step described later. It also may be divided into multiple times.

As the blowing agent, a physical blowing agent may be used. Examples of the physical blowing agent include, as organic physical blowing agents, aliphatic hydrocarbons such as propane, butane, pentane, hexane, and heptane, alicyclic hydrocarbons such as cyclopentane and cyclohexane, halogenated hydrocarbons such as chlorofluoromethane, trifluoromethane, 1,1-difluoroethane, 1,1,1,2-tetrafluoroethane, methyl chloride, ethyl chloride, and methylene chloride, and dialkyl ethers such as dimethyl ether, diethyl ether, and methyl ethyl ether. Examples of inorganic physical blowing agents include carbon dioxide, nitrogen, helium, argon, and air.

Among the physical blowing agents, inorganic physical blowing agents are preferable, carbon dioxide or nitrogen is more preferable, and carbon dioxide is further preferable from the viewpoints of having less impact on the environment, not being flammable, and being superior in safety.

The conditions for impregnating the polyamide-based resin beads with the blowing agent are not particularly limited. From the viewpoint of sufficiently impregnating the polyamide-based resin beads with the blowing agent in a short time, it is preferable to impregnate the polyamide-based resin beads with the blowing agent under pressure, and more preferably under heating.

The expansion ratio of the expanded beads is mainly determined by the type of blowing agent, the amount of impregnation of the blowing agent into the resin beads, and the temperature at the time of blowing (expanding temperature). The amount of the blowing agent impregnated into the resin beads is affected by the pressure in the closed vessel after the addition of the blowing agent into the closed vessel and before the expanding step. It is preferable to add the blowing agent into the closed vessel such that the pressure becomes 1.5 MPa (G) or more, more preferably 2.5 MPa (G) or more, and preferably such that the pressure becomes 7 MPa (G) or less, and more preferably 5 MPa (G) or less. Hereinafter, this pressure is also referred to as impregnation pressure.

In addition, "1.5 MPa (G)" means that the gauge pressure is 1.5 MPa.

By the way, the polyamide-based resin has higher water absorption than polypropylene-based resins and the like. For this reason, in the production method in which an aqueous dispersion medium such as water is used as a dispersion medium, the dispersion step and the step of raising the temperature to the expanding temperature also have a role of allowing the polyamide-based resin beads to absorb water.

The melting point of the polyamide-based resin beads that have been plasticized by absorbing water (hereinafter, also referred to as the melting point after plasticization) is lower than the melting point peculiar to the resin beads before the plasticization. For this reason, in the expanding step of expanding the plasticized polyamide-based resin beads, the expanding temperature may be set based on the melting point after plasticization. When the melting point after plasticization is used as a basis, it is possible to perform the expanding step at a temperature significantly lower than the temperature described in JP 61-268737 A.

The temperature rising rate in the step of raising the temperature to the expanding temperature described above is preferably set to 10° C./minute or less, and more preferably 7° C./minute or less. On the other hand, from the viewpoint of the productivity of the polyamide-based resin expanded beads, the temperature rising rate is preferably 1° C./minute or more, and more preferably 2° C./minute or more.

As a more desirable embodiment, it is preferable to perform temperature control (hereinafter, also referred to as a temperature holding step) for holding the temperature of the dispersion liquid in a certain temperature range for a certain period of time before the expanding step. By performing the temperature holding step, the resin beads are more uniformly impregnated with the blowing agent, and the high temperature peak is satisfactorily formed. As a result, at the time of expanding, each expandable resin bead is easily expanded uniformly, so that the variation in size of the resulting polyamide-based resin expanded beads can be further suppressed.

The certain temperature range in the temperature holding step is preferably not lower than a temperature 90° C. lower than the melting point of the polyamide-based resin beads (T3) (that is T3−90° C.), more preferably not lower than a temperature 80° C. lower (that is T3−80° C.), further preferably not lower than a temperature 70° C. lower (that is T3−70° C.), and particularly preferably not lower than a temperature 65° C. lower (that is T3−65° C.), and it is preferably lower than a temperature 50° C. lower (that is T3−50° C.), more preferably not higher than a temperature 55° C. lower (that is T3−55° C.), further preferably not higher than a temperature 57° C. lower (that is T3−57° C.), and particularly preferably not higher than a temperature 59° C. lower (that is T3−59° C.). The melting point of the polyamide-based resin beads (T3) referred to herein refers to the melting point before being plasticized by water.

From the viewpoint of uniformly impregnating the polyamide-based resin with the blowing agent and suppressing the variation in size of the expanded beads, the certain period of time in the temperature holding step is preferably 1 minute or more, preferably 5 minutes or more, further preferable 10 minutes or more, and particularly preferably 13 minutes or more. From the viewpoint of the productivity of the polyamide-based resin expanded beads and from the viewpoint of preventing the hydrolysis of the polyamide-based resin, the certain period of time is preferably 60 minutes or less, more preferably 40 minutes or less, further preferably 30 minutes or less, and particularly preferably 20 minutes or less.

When the temperature holding step is performed, the temperature of the dispersion liquid during the temperature holding may be constant or may vary within the above-mentioned range. The temperature of the dispersion liquid in the temperature holding step can be set in multiple steps within the above-mentioned temperature range, and may be continuously raised over an appropriate time within the temperature range. From the viewpoints of uniformly impregnating the polyamide-based resin with the blowing agent and suppressing the variation in size of the expanded beads, it is preferable to set the temperature to one stage (that is, the temperature held in the temperature holding step is constant) and hold this temperature for the certain period of time as described above.

[Expanding Step]

The expanding step is a step of releasing the expandable polyamide-based resin beads obtained in the above-described blowing agent addition step from the closed vessel to a pressure lower than the pressure in the closed vessel (usually to the atmospheric pressure) to expand. In the expanding step, when a large number of expandable polyamide-based resin beads are sequentially released from the closed vessel, controlled temperature raise of continuously or intermittently raising the temperature in the closed vessel may be appropriately performed. By performing the controlled temperature raise, even when the expanding step is performed in a large-capacity closed vessel, control can be made such that the crystallinity of the expanded beads released in the first half of the expanding step does not significantly differ from the crystallinity of the expanded beads released in the second half of the expanding step.

The temperature of the dispersion liquid immediately before expanding (expanding temperature T2) is preferably not lower than a temperature 90° C. lower than the inherent melting point temperature of the polyamide-based resin beads (T3) (that is T3−90° C.), more preferably not lower than a temperature 80° C. lower (that is T3−80° C.), further preferably not lower than a temperature 70° C. lower (that is T3−70° C.), and particularly preferably not lower than a temperature 65° C. lower (that is T3−65° C.), and it is preferably lower than a temperature 50° C. lower (that is T3−50° C.), more preferably not higher than a temperature 55° C. lower (that is T3−55° C.), further preferably not higher than a temperature 57° C. lower (that is T3−57° C.), and particularly preferably not higher than a temperature 59° C. lower (that is T3−59° C.). For example, the expanding temperature T2 is preferably in the range of the following formula (8) with respect to the inherent melting point temperature of the polyamide-based resin beads T3.

[Numerical Formula 8]

$$T8-90° C. \leq T2 < T3-50° C. \tag{8}$$

The temperature rising rate in the controlled temperature raise is not particularly limited, and it is preferably 0.2° C./10 minutes or more, more preferably 0.3° C./10 minutes or more, and is preferably 1.5° C./10 minutes or less, and more preferably 1.0° C./10 minutes or less. For example, the controlled temperature raise is preferably performed at a temperature rising rate of 0.2° C./10 minutes or more and 1.5° C./10 minutes or less.

The time of performing the controlled temperature raise is not particularly limited, and for example, it is preferable to perform the temperature raise continuously or stepwise from the start of expanding to the end of expanding.

The pressure in the closed vessel immediately before the release in the expanding step (the expanding pressure) is preferably 0.5 MPa (G) or more, more preferably 1.5 MPa (G) or more, and even more preferably 2.5 MPa (G) or more. The expanding pressure is preferably 10.0 MPa (G) or less, more preferably 7.0 MPa (G) or less, and even more preferably 5.0 MPa (G) or less.

As described above, it is possible to obtain polyamide-based resin expanded beads having the configuration specified in the present invention by producing expanded beads in consideration of the water absorption and the crystallization rate of the polyamide-based resin.

EXAMPLES

Hereinafter, the present invention will be described in detail with reference to Examples, but the present invention is not limited thereto. The production conditions, etc. related to the production of the polyamide-based resin expanded beads of the respective Examples and Comparative Examples are shown in Table 1. In addition, the results of measurement and evaluation of the expanded beads of each Example and each Comparative Example, and the molding pressure at the time of production and the results of surface smoothness evaluation of the molded article of expanded beads produced using the expanded beads are also shown in Table 1.

In the Examples, UBE Nylon 5033B (manufactured by Ube Industries, Ltd.) was used as a polyamide-based resin. UBE Nylon 5033B is a polyamide 6/66 copolymer (Nylon 6/66), which is a resin with polyamide 6:polyamide 66=85:15, a melting point of 197° C., a density of 1.14 g/cm$^3$, and a flexural modulus of 1260 MPa. As the above-mentioned polyamide-based resin, one which was vacuum-dried and stored at a moisture content of 0.1% or less for 24 hours was used.

(Measurement of Flexural Modulus)

The flexural modulus of the polyamide-based resin used was determined by measuring in accordance with JIS K7171: 2016. For the flexural modulus, a resin test piece having a thickness of 4 mm, a width of 10 mm, and a length of 80 mm was prepared, then the test piece was allowed to stand in a state with a room temperature of 23° C. and a humidity of 50% for 72 hours, and then a flexural modulus was measured with a testing machine Autograph AGS-10kNG (manufactured by Shimadzu Corp.) under conditions including a distance between fulcrums of 64 mm, a radius R of an indenter of 15.0 mm, a radius R of a support of 25.0 mm, a testing rate of 2 ram/min, a room temperature of 23° C., and a humidity of 50%. The average value of the calculated values (5 points) was adopted.

(Density)

The density of the polyamide-based resin used was determined based on the method described in ISO 1183-3.

Example 1

[Production of Polyamide-Based Resin Beads]

The above-mentioned polyamide-based resin was fed to an extruder, and 0.8 parts by mass of "Talcan Pawder PK-S" (manufactured by Hayashi Kasei Co., Ltd.) as a cell controlling agents and 1 part by mass of "Stabaxol P" (manufactured by Rhein Chemie Corp.) as a terminal blocking agent were added to 100 parts by mass of the polyamide-based resin and melt-kneaded to afford a melt-kneaded material.

The melt-kneaded material was extruded into a strand form having a circular cross section through pores of the mouthpiece attached to the tip of the extruder. The extruded strand-shaped melt-kneaded material was water-cooled, cut with a pelletizer, and dried to afford polyamide-based resin beads having an average bead weight of 2 mg and an average L/D value of 1.15. The obtained polyamide-based resin beads were dried in an oven at 60° C. for 24 hours, and then adjusted the state for 24 hours in an atmosphere at 23° C. and a relative humidity of 50%. After adjusted the state, 100 polyamide-based resin beads were randomly chosen, their total weight was measured, and the weight was divided by 100 to obtain the average value of bead weight. Ten polyamide-based resin beads were randomly chosen from the obtained polyamide-based resin beads, and the length (L) of each bead in the extrusion direction and the maximum diameter (D) in a cross section orthogonal to the extrusion direction were measured, and L/D of each bead was calculated, and their arithmetic mean value was taken as the average value of L/D.

[Production of Polyamide-Based Resin Expanded Beads]

One kilogram of the polyamide-based resin beads obtained as described above and 3 liters of water as a dispersion medium were charged into a 5-liter autoclave equipped with a stirrer, and further, for 100 parts by mass of the polyamide-based resin beads, 0.3 parts by mass of kaolin as a dispersant, and 0.004 parts by mass of sodium alkylbenzene sulfonate as a surfactant were added to the dispersion liquid. The temperature raise was started from room temperature (23° C.) while stirring the contents in the autoclave, and before reaching the holding temperature (137° C.) (impregnation temperature: 132° C.), carbon dioxide as a blowing agent was injected into the autoclave. The injection of carbon dioxide was performed until the pressure in the autoclave reached 2.5 MPa (G). At this time, the temperature raising time from room temperature (23° C.) to reaching the impregnation temperature was 40 minutes. The average rate calculated by dividing the value obtained by subtracting the room temperature (23° C.) from the impregnation temperature by the temperature raising time was used as the temperature rising rate. After the temperature was further raised and reached the holding temperature of 137° C., while carbon dioxide was injected such that the pressure in the autoclave was maintained at 2.5 MPa (G), the temperature was held at 137° C. for 15 minutes (that is, a temperature holding step of holding temperature for 15 minutes was performed). Then, by opening the valve at the bottom of the autoclave, the polyamide-based resin beads impregnated with the blowing agent were released together with the dispersion liquid into the atmospheric pressure (about 0.1 MPa (absolute pressure)).

The resulting polyamide-based resin expanded beads were cured in an oven at 60° C. for 24 hours, and then slowly cooled to afford polyamide-based resin expanded beads.

[Production of Molded Article of Polyamide-Based Resin Expanded Beads]

Next, a molded article of polyamide-based resin expanded beads was produced using the polyamide-based resin expanded beads obtained as described above.

First, polyamide-based resin expanded beads were added into a flat mold having a length of 200 mm, a width of 250 mm, and a thickness of 50 mm and composed of a pair of opposing mold halves, and in-mold molding by steam heating was performed to form a plate-shaped molded article of expanded beads.

As for the heating method, steam was fed for 5 seconds with the drain valves of both mold halves open, and preheating (exhaust step) was performed. After that, steam with a pressure 0.04 MPa (G) lower than the molding steam pressure shown in Table 1 was fed into the cavity from one mold half, and steam with a pressure 0.02 MPa (G) lower than the molding steam pressure shown in Table 1 was further fed into the cavity from the other mold half. The expanded beads were then heated by feeding steams with the molding steam pressures shown in Table 1 from both mold halves into the molding cavity.

After the heating was completed, the pressure was released, and after water cooling until the surface pressure due to the expanding force of the molding decreased to 0.02 MPa (gauge pressure), the mold was opened and the molding was taken out from the mold. The obtained molding was cured in an oven at 80° C. for 12 hours, and then slowly cooled to room temperature. In this way, a molded article of polyamide-based resin expanded beads was obtained.

Example 2

Example 2 was manufactured as follows.

Using polyamide-based resin beads obtained by the same method as in Example 1, polyamide-based resin expanded beads were prepared by the following method.

First, 1 kg of the obtained polyamide-based resin beads were completely immersed in 3 liters of water and allowed to stand for 1 hour. Next, the resin beads taken out from the water were charged into a 5 L autoclave, and carbon dioxide as a blowing agent was injected into the autoclave until the pressure in the autoclave (impregnation pressure) became 4 MPa (G). Next, 10° C. (impregnation temperature) and 4 MPa (G) were maintained for 3 hours. Then, the polyamide-based resin beads impregnated with the blowing agent were taken out from the autoclave and transferred to a expanding vessel filled with an oil medium heated to 210° C. (expanding temperature). Then, the polyamide-based resin beads impregnated with the blowing agent were immersed in the oil medium to expand. The surface of the resulting polyamide-based resin expanded beads was washed with normal hexane to remove the oil. Then, the washed polyamide-based resin expanded beads were cured in an oven at 60° C. for 24 hours, and then slowly cooled to afford polyamide-based resin expanded beads. Using the obtained polyamide-based resin expanded beads, a molded article of polyamide-based resin expanded beads was obtained in the same manner as in Example 1 except that the molding steam pressure was set as shown in Table 1

Example 3

Example 3 was manufactured as follows.

Polyamide-based resin expanded beads were produced in the same manner as in Example 1 except that the holding temperature and the expanding temperature were set to 136° C. and the pressure in the autoclave was changed to 4.0 MPa (G), which was referred to as Example 3. Then, a molded article of polyamide-based resin expanded beads was produced using Example 3.

Example 4

Example 4 was manufactured as follows.

Polyamide-based resin expanded beads were produced in the same manner as in Example 1 except that the weight of the resin beads was changed to 5 mg, which was referred to as Example 4. Then, a molded article of polyamide-based resin expanded beads was produced using Example 4.

Comparative Example 1

Comparative Example 1 was manufactured as follows.
Using polyamide-based resin beads obtained by the same method as in Example 1, polyamide-based resin expanded beads were prepared by the following method.

The resulting polyamide-based resin beads were charged into an autoclave at 10° C. and allowed to stand in a carbon dioxide atmosphere of 4.0 MPa for 3 hours to impregnate the polyamide-based resin beads with carbon dioxide. This was taken out, placed in a hot air expand equipment, and hot air at 240° C. was blown for 20 seconds to afford polyamide-based resin expanded beads. The resulting polyamide-based resin expanded beads were cured in an oven at 60° C. for 24 hours and then slowly cooled to afford polyamide-based resin expanded beads of Comparative Example 1. Using the obtained polyamide-based resin expanded beads, a molded article of polyamide-based resin expanded beads was obtained in the same manner as in Example 1 except that the molding steam pressure was set as shown in Table 1.

Comparative Example 2

The expanded beads obtained in Comparative Example 1 were charged into a pressure vessel held at 70° C., and compressed air was injected over 24 hours until the pressure in the pressure vessel reached 0.60 MPa (G), and then held for 24 hours. The resulting expanded beads were taken out, placed in a hot air expand equipment, and hot air at 240° C. was blown for 20 seconds to further expand the polyamide-based resin expanded beads. The polyamide-based resin expanded beads thus obtained were cured in an oven at 60° C. for 24 hours and then slowly cooled to afford polyamide-based resin expanded beads of Comparative Example 2. Then, using the obtained polyamide-based resin expanded beads, a molded article of polyamide-based resin expanded beads was obtained in the same manner as in Example 1 except that the molding steam pressure was set as shown in Table 1.

Comparative Example 3

Polyamide-based resin expanded beads were produced in the same manner as in Example 1 except that no temperature holding time was provided in Example 1 and the expanding temperature was changed to 160° C., which was referred to as Comparative Example 3. Then, using Comparative Example 3, a molded article of polyamide-based resin expanded beads was produced in the same manner as in Example 1.

Comparative Example 4

Polyamide-based resin expanded beads were produced in the same manner as in Example 1 except that the weight of the resin beads was changed to 10 mg, which was referred to as Comparative Example 4. Then, using Comparative Example 4, a molded article of polyamide-based resin expanded beads was produced in the same manner as in Example 1.

The physical properties of polyamide-based resin expanded beads shown below were measured after the adjusting the state shown below was performed. First, the obtained polyamide-based resin expanded beads were placed in an environment with a temperature of 60° C. for 24 hours, and then slowly cooled to room temperature (23° C.). Next, the adjusting the state was performed by allowing the expanded beads to stand for 24 hours in an environment with a temperature of 23° C. and a relative humidity of 50%.

(Measurement of Amount of Heat of High Temperature Peak)

Using the expanded beads obtained in each example or comparative example as a test piece, they were heat-melted from 30° C. to a temperature 30° C. higher than the temperature at the end of the melting peak at a heating rate of 10° C./minute based on the heat flux differential scanning calorimetry method of JIS K7122-1987, and a DSC curve was measured. As a measuring device, a high-sensitivity differential scanning calorimeter "EXSTAR DSC7020" (manufactured by SII NanoTechnology Inc.) was used.

In the obtained DSC curve, the area of the high temperature peak b having the peak top temperature of which appears on the higher temperature side than the peak top temperature of the intrinsic peak a was determined in the same manner as in FIG. 1.

(Measurement of Cell Diameter)

The average cell diameter of polyamide-based resin expanded beads was measured by the following method. First, an expanded bead was divided into two so as to pass through the center of the expanded bead, and the cut surface was photographed with a scanning electron microscope. Next, in the obtained cross-sectional photograph, straight lines were drawn from the vicinity of the center of the cut surface of the expanded bead to the surface of the expanded bead in eight directions with variation of angle by 45°, and the number of all cells intersecting the straight lines was counted. The value determined by dividing the total length of the straight lines by the number of the counted cells was defined as the cell diameter of the expanded bead. This operation was performed in the same manner for 10 expanded beads, and the arithmetic mean value of the cell diameters of the individual expanded beads was taken as the average cell diameter of the expanded beads.

(Measurement of Apparent Density)

The apparent density of the expanded beads of each Example or Comparative Example was measured as follows.

A graduated cylinder containing water at a temperature of 23° C. was prepared, and the mass W1 of expanded beads having a bulk volume of about 500 cm$^3$ was measured and the expanded beads were submerged using a wire mesh in the graduated cylinder. Considering the volume of the wire mesh, the volume V1 [cm$^3$] of the expanded beads read from the rise in water level was measured. The mass W1 [g] of the expanded beads was divided by the volume V1 (W1/V1), the unit was converted to [kg/m$^3$], and thus the apparent density of the expanded beads was determined.

(Measurement of Expanded Bead Dimensions)

The average value of a short diameter of expanded beads and the average value of the ratio (a long diameter)/(a short diameter) of the expanded beads were determined as follows. A sample group was prepared by using 1000 beads randomly selected from each of the expanded beads of each Example or Comparative Example as a sample group. Then, the a short diameter and the a long diameter of each expanded bead constituting the sample group were measured. For each sample, the a long diameter/a short diameter was determined as the above ratio. The arithmetic mean values thereof were calculated to obtain the average value of the a short diameter of the expanded beads and the average value of the above ratio.

The standard deviation of the ratio (a long diameter)/(a short diameter) and the coefficient of variation were determined using the above formulae (3) and (4). The average value, standard deviation, and coefficient of variation of the ratio (a long diameter)/(a short diameter) are all shown in Table 1.

In addition, the short diameter of each expanded bead constituting the sample group was measured. Then, the arithmetic mean value of a short diameter of the sample group was calculated, and this was used as the average value of a short diameter of the expanded beads. The standard deviation and the coefficient of variation of the a short diameter of the expanded beads were determined using the above formulae (5) and (6). The average value, standard deviation, and coefficient of variation of a short diameter are all shown in Table 1.

For the measurement of the ratio (a long diameter)/(a short diameter) and the a short diameter described above, PartAn 3D (projection image photographing type bead size distribution analyzer) manufactured by MicrotracBEL Corp. was used.

(Weight Measurement of Expanded Beads)

The average value of bead weight of the expanded beads was determined by randomly choosing 50 expanded beads from the expanded beads obtained as each Example or Comparative Example, actually measuring the weight for each bead, and calculating the arithmetic mean value of the actually measured weights. The standard deviation of the bead weight and the coefficient of variation were obtained using the above formulae (1) and (2). The average value, standard deviation, and coefficient of variation of weight of the expanded beads are all shown in Table 1.

(Evaluation of Filling Property of Expanded Beads into Mold)

The molding 1 obtained by using a mold having a thickness of 50 mm as described above and the molding 2 obtained by changing the mold to a flat mold having a length of 300 mm, a width of 300 mm, and a thickness of 10 mm were evaluated for their difference in molding density as follows. The density of a molding was determined as follows. The expanded bead molding was cut into samples (length 100 mm×width 100 mm×thickness 5 mm) excluding the skin surface, and the volume of the samples was determined from the external dimensions of the samples. Then, the density of the molding was obtained by dividing the total weight of the samples by the volume.

A (Very Good): The difference in density between the molding 1 and the molding 2 was less than 10%.

B (Good): The difference in density between the molding 1 and the molding 2 was 10% or more and 15% or less.

C (Bad): The difference in density between the molding 1 and the molding 2 was more than 15%.

(Evaluation of Surface Smoothness of Molded Article of Expanded Beads)

The surface smoothness of molded article of expanded beads was evaluated as follows. The more the gaps among the expanded beads on the surface of the molding are filled, the better the surface property is.

B (Good): The voids among the expanded beads on the surface of the molding are filled.

C (Bad): The voids among the expanded beads on the surface of the molding are not filled.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Resin | Resin | — | 5033B | 5033B | 5033B | 5033B | 5033B | 5033B | 50338 | 50338 |
| | Average weight | mg | 2.0 | 2.0 | 2.0 | 5.0 | 2.0 | 2.0 | 2.0 | 10.0 |
| | L/D | — | 1.15 | 1.15 | 1.15 | 1.15 | 1.15 | 1.15 | 1.15 | 1.15 |
| | Modifier | — | Stabaxol P | Stabaxol P | Stabaxol P | Stabaxol P | Stabaxol P | Stabaxol P | Stabaxol P | Stabaxol P |
| | Amount of added modifier | part by weight | 1.0 | 1.0 | 1.0 | 1.0 | 1.0 | 1.0 | 1.0 | 1.0 |
| | Temperature holding time | min | 15 | — | 15 | 15 | — | — | 15 | 15 |
| Expanded beads | Amount of heat of fusion of high temperature peak | J/g | 10 | 0 | 10 | 12 | 0 | 0 | 0 | 11 |
| | Cell diameter | μm | 160 | 160 | 140 | 160 | 220 | 260 | 200 | 160 |
| | Apparent density | kg/m³ | 220 | 240 | 95 | 220 | 540 | 230 | 200 | 220 |
| | Ratio (long diameter)/ (short diameter) | Average | — | 1.10 | 1.10 | 1.18 | 1.15 | 1.31 | 1.40 | 1.28 | 1.15 |
| | | Standard deviation | — | 0.05 | 0.06 | 0.08 | 0.10 | 0.18 | 0.20 | 0.16 | 0.10 |
| | | Coefficient of variation | % | 4.5 | 5.5 | 6.8 | 8.7 | 13.7 | 14.3 | 12.5 | 8.7 |
| | Short diameter | Average | mm | 2.7 | 2.6 | 3.4 | 3.5 | 2.0 | 2.5 | 3.2 | 4.4 |
| | | Standard deviation | mm | 0.18 | 0.22 | 0.25 | 0.24 | 0.21 | 0.32 | 0.40 | 0.32 |
| | | Coefficient of variation | % | 6.7 | 8.5 | 7.4 | 6.9 | 10.7 | 12.7 | 12.5 | 7.3 |
| | Weight | Average | mg | 2.0 | 2.0 | 2.0 | 5.0 | 2.0 | 2.0 | 2.0 | 10.0 |
| | | Standard deviation | mg | 0.10 | 0.10 | 0.10 | 0.25 | 0.10 | 0.10 | 0.10 | 0.50 |
| | | Coefficient of variation | % | 5.0 | 5.0 | 5.0 | 5.0 | 5.0 | 5.0 | 5.0 | 5.0 |
| | Filling property into mold | — | A | A | B | B | A | A | B | C |
| Expanded beads molding | Molding steam pressure | MPa(G) | 0.20 | 0.12 | 0.20 | 0.20 | 0.12 | 0.12 | 0.20 | 0.20 |
| | Surface smoothness evaluation | — | B | B | B | B | C | C | C | B |

The above embodiments include the following technical concepts.

(1) Polyamide-based resin expanded beads that are expanded beads including
a polyamide-based resin as a base resin, in which
the average value of bead weight of the expanded beads is 0.5 mg or more and 8 mg or less, and the coefficient of variation of the bead weight is 10% or less, and
the average value of the ratio of a long diameter to a short diameter (a long diameter/a short diameter) of the expanded beads measured with a projection image photographing type bead size distribution analyzer is 1 or more and 1.5 or less, the coefficient of variation of the ratio (a long diameter/a short diameter) is 12% or less, the average value of the a short diameter is 1 mm or more and 4 mm or less, and the coefficient of variation of the a short diameter is 10% or less.

(2) The polyamide-based resin expanded beads according to (1) above, in which the average value of bead weight of the expanded beads is 0.5 mg or more and 3 mg or less.

(3) The polyamide-based resin expanded beads according to (1) or (2) above, in which the polyamide-based resin is a modified polyamide-based resin modified with one or more compounds selected from among a carbodiimide compound, an oxazoline compound, an isocyanate compound, and an epoxy compound.

(4) The polyamide-based resin expanded beads according to any one of (1) to (3) above, including a crystalline structure that exhibits, in a DSC curve obtained under the following condition 1, a melting peak intrinsic to the polyamide-based resin (an intrinsic peak) and a melting peak having a peak top temperature on the higher temperature side than the peak temperature of the intrinsic peak (a high temperature peak):

(Condition 1)

Based on the heat flux differential scanning calorimetry of JIS K7121-1987, polyamide-based resin expanded beads as a test piece were melted by heating from 30° C. to a temperature 30° C. higher than the end of the melting peak at a heating rate of 10° C./minute, and the DSC curve is measured.

(5) The polyamide-based resin expanded beads according to any one of (1) to (4) above, in which the coefficient of variation of the ratio (a long diameter/a short diameter) is 10% or less.

(6) The polyamide-based resin expanded beads according to any one of (1) to (5) above, in which the polyamide-based resin expanded beads have an apparent density of 10 kg/m³ or more and 300 kg/m³ or less.

(7) The polyamide-based resin expanded beads according to any one of (1) to (6) above, in which the polyamide-based resin has a melting point of 180° C. or higher.

(8) A molded article of polyamide-based resin expanded beads formed by in-mold molding of the polyamide-based resin expanded beads according to any one of (1) to (7) above.

What is claimed is:

1. Polyamide-based resin expanded beads that are expanded beads, comprising a polyamide-based resin as a base resin, wherein the average value of bead weight of the expanded beads is 0.5 mg or more and 8 mg or less, and the coefficient of variation of the bead weight is 10% or less, and the average value of the ratio of a long diameter to a short diameter (a long diameter/a short diameter) of the expanded beads measured with a projection image photographing type bead size distribution analyzer is 1 or more and 1.5 or less, the coefficient of variation of the ratio (a long diameter/a short diameter) is 12% or less, the average value of a short diameter is 1 mm or more and 4 mm or less, and the coefficient of variation of a short diameter is 10% or less.

2. The polyamide-based resin expanded beads according to claim 1, wherein the average value of bead weight of the expanded beads is 0.5 mg or more and 3 mg or less.

3. The polyamide-based resin expanded beads according to claim 1, wherein the polyamide-based resin is a modified polyamide-based resin modified with one or more compounds selected from among a carbodiimide compound, an oxazoline compound, an isocyanate compound, and an epoxy compound.

4. The polyamide-based resin expanded beads according to claim 1, comprising a crystalline structure that exhibits, in a DSC curve obtained under the following condition 1, a melting peak intrinsic to the polyamide-based resin (an intrinsic peak) and a melting peak having a peak temperature on the higher temperature side than the peak top temperature of the intrinsic peak (a high temperature peak):

(Condition 1)

Based on the heat flux differential scanning calorimetry of JIS K7121-1987, polyamide-based resin expanded beads as a test piece were melted by heating from 30° C. to a temperature 30° C. higher than the end of the melting peak at a heating rate of 10° C./minute, and the DSC curve is measured.

5. The polyamide-based resin expanded beads according to claim 1, wherein the coefficient of variation of the ratio (a long diameter/a short diameter) is 10% or less.

6. The polyamide-based resin expanded beads according to claim 1, wherein the polyamide-based resin expanded beads have an apparent density of 10 kg/m³ or more and 300 kg/m³ or less.

7. The polyamide-based resin expanded beads according to claim 1, wherein the polyamide-based resin has a melting point of 180° C. or higher.

8. A molded article of polyamide-based resin expanded beads formed by in-mold molding of the polyamide-based resin expanded beads according to claim 1.

* * * * *